United States Patent
Akiba et al.

(10) Patent No.: US 11,123,967 B2
(45) Date of Patent: Sep. 21, 2021

(54) HEAT RESISTANT RELEASE SHEET AND METHOD FOR MANUFACTURING SAME

(71) Applicant: NITTO DENKO CORPORATION, Osaka (JP)

(72) Inventors: Kurato Akiba, Osaka (JP); Yuta Kuroki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 204 days.

(21) Appl. No.: 16/498,117

(22) PCT Filed: Mar. 27, 2018

(86) PCT No.: PCT/JP2018/012600
§ 371 (c)(1),
(2) Date: Sep. 26, 2019

(87) PCT Pub. No.: WO2018/181403
PCT Pub. Date: Oct. 4, 2018

(65) Prior Publication Data
US 2020/0101703 A1    Apr. 2, 2020

(30) Foreign Application Priority Data
Mar. 30, 2017   (JP) .............................. JP2017-068007

(51) Int. Cl.
*B32B 27/30* (2006.01)
*B32B 27/32* (2006.01)
(Continued)

(52) U.S. Cl.
CPC ............ *B32B 27/322* (2013.01); *B29C 33/68* (2013.01); *B32B 7/06* (2013.01); *B32B 2307/306* (2013.01); *B32B 2307/748* (2013.01)

(58) Field of Classification Search
CPC ... B32B 27/322; B32B 7/06; B32B 2307/306; B32B 2307/748
(Continued)

(56) References Cited

U.S. PATENT DOCUMENTS

| 4,801,506 A | 1/1989 | Motonari et al. |
| 6,106,949 A | 8/2000 | Kataoka et al. |

(Continued)

FOREIGN PATENT DOCUMENTS

| EP | 185590 | 6/1986 |
| JP | 61-141532 | 6/1986 |

(Continued)

OTHER PUBLICATIONS

Takeshi Suwa et al., "Melting and Crystallization Behavior of Poly(tetrafluoroethykene). New Method for Molecular Weight Measurement of Poly(tetrafluoroethylene) Using a Differential Scanning Calorimeter," Journal of Applied Polymer Science vol. 17, 1973, pp. 3253-3257.

(Continued)

*Primary Examiner* — Betelhem Shewareged
(74) *Attorney, Agent, or Firm* — Greenblum & Bernstein P.L.C.

(57) ABSTRACT

A heat resistant release sheet of the present disclosure includes a polyimide substrate, and a first polytetrafluoroethylene (PTFE) layer and a second PTFE layer that sandwich the polyimide substrate therebetween. PTFE composing the first PTFE layer and PTFE composing the second PTFE layer each have a number-average molecular weight of 6 million or more, and a peel force required to peel the first PTFE layer from the polyimide substrate is 0.5 N/20 mm or more, and a peel force required to peel the second PTFE layer from the polyimide substrate is less than 0.5 N/20 mm. The heat resistant release sheet of the present (Continued)

disclosure has a new structure and can also be used for thermocompression bonding at a higher temperature.

8 Claims, 3 Drawing Sheets

(51) Int. Cl.
  *B29C 33/68* (2006.01)
  *B32B 7/06* (2019.01)
(58) Field of Classification Search
  USPC .......................................................... 428/352
  See application file for complete search history.

(56) References Cited

U.S. PATENT DOCUMENTS

| | | |
|---|---|---|
| 2016/0276676 A1 | 9/2016 | Kuroki |
| 2020/0101703 A1* | 4/2020 | Akiba .................. B32B 27/322 |

FOREIGN PATENT DOCUMENTS

| | | |
|---|---|---|
| JP | 62-162542 | 7/1987 |
| JP | 62-162543 | 7/1987 |
| JP | 62-223236 | 10/1987 |
| JP | 7-11028 | 1/1995 |
| JP | 8-276547 | 10/1996 |
| JP | 2008-127471 | 6/2008 |
| JP | 2015-96325 | 5/2015 |
| WO | 2015/052860 | 4/2015 |

OTHER PUBLICATIONS

ISR issued in International Patent Application No. PCT/JP2018/012600, dated Jul. 3, 2018, English translation.

IPRP issued in International Patent Application No. PCT/JP2018/012600, dated Oct. 1, 2018, English translation.

* cited by examiner

FIG.5

HEAT RESISTANT RELEASE SHEET AND METHOD FOR MANUFACTURING SAME

TECHNICAL FIELD

The present invention relates to a heat resistant release sheet and a method for manufacturing the same.

BACKGROUND ART

Thermocompression bonding is used for flip chip mounting of semiconductor chips using an underfill such as an NCF (Non-Conductive Film) and an NCP (Non-Conductive Paste) and for manufacturing of printed circuit boards (PCBs). The thermocompression bonding is also used, for example, for bonding of an electronic part to a PCB by using an anisotropic conductive film (ACF). Generally, a thermocompressing head, which is a heat source as well as a pressure source, is used to thermocompression-bond an object to be compression-bonded. In order to prevent adhesion between the object to be compression-bonded and the thermocompression head at the time of thermocompression bonding, a heat resistant release sheet is usually placed between the object to be compression-bonded and the thermocompression head. Conventionally, a sheet of fluororesin with excellent releasability is used as the heat resistant release sheet. Examples of the fluororesin include polytetrafluoroethylene (hereinafter referred to as "PTFE") having excellent heat resistance.

Like PTFE, polyimide is known as a resin with excellent heat resistance and it has a higher heat resistance than PTFE. The following disclosures each are known as a composite of polyimide and PTFE.

Patent Literature 1 discloses a polyimide film having a fluororesin layer as an adhesive layer. The polyimide film is used, for example, as an insulating covering material and wound around an electric wire. In this case, the fluororesin layer thermally adheres to an adjoining polyimide film, allowing the polyimide films, which alone have low adhesiveness, to adhere to each other.

Patent Literature 2 discloses a sheet for thin layer transfer including: a substrate composed of a thin metal film or a thin film of a heat resistant resin such as polyimide; and a fluorine resin layer.

CITATION LIST

Patent Literature

Patent Literature 1: JP 62(1987)-162543 A
Patent Literature 2: JP 2015-096325 A

Technical Problem

In the thermocompression bonding mentioned above, it is anticipated that the temperature used increases to improve mounting efficiency. In a heat resistant release sheet, it is an exposed surface in contact with the thermocompression head that is heated up to a highest temperature.

The present invention is intended to provide a heat resistant release sheet that has a new structure and that can also be used for thermocompression bonding at a higher temperature.

Solution to Problem

The present invention relates to a heat resistant release sheet A including:
a polyimide substrate; and
a first PTFE layer and a second PTFE layer that sandwich the polyimide substrate therebetween, wherein
PTFE composing the first PTFE layer and PTFE composing the second PTFE layer each have a number-average molecular weight of 6 million or more, and
a peel force required to peel the first PTFE layer from the polyimide substrate is 0.5 N/20 mm or more, and a peel force required to peel the second PTFE layer from the polyimide substrate is less than 0.5 N/20 mm.

In another aspect, the present invention provides a method (a first manufacturing method) for manufacturing the heat resistant release sheet A, including:
forming a film of a PTFE dispersion liquid on each of both principal surfaces of the polyimide substrate, only one of the principal surfaces having been treated with a low-temperature plasma treatment; and
by drying and sintering the formed films, forming the first PTFE layer from the film on the one of the principal surfaces and the second PTFE layer from the film on the other principal surface of the polyimide substrate so as to obtain the heat resistant release sheet.

In still another aspect, the present invention provides a heat resistant release sheet B including:
a polyimide substrate; and
a PTFE layer disposed on one of principal surfaces of the polyimide substrate, wherein
PTFE composing the PTFE layer has a number-average molecular weight of 6 million or more, and
a peel force required to peel the PTFE layer from the polyimide substrate is 0.5 N/20 mm or more.

In still another aspect, the present invention provides a method (a second manufacturing method) for manufacturing a heat resistant release sheet, including:
removing the second PTFE layer from the heat resistant release sheet A; and
obtaining the heat resistant release sheet B.

Advantageous Effects of Invention

The heat resistant release sheet A of the present invention is provided with high releasability on the both principal surfaces by the PTFE layers that sandwich the substrate. In addition, the heat resistant release sheet A can also be used for thermocompression bonding at a higher temperature because it has the polyimide substrate and the PTFE layers each composed of high molecular weight PTFE that tends to have higher heat resistance than low molecular weight PTFE. Moreover, in the heat resistant release sheet A, the peel force required to peel the second PTFE layer from the polyimide substrate is 0.5 N/mm or less. Thus, the second PTFE layer is removed easily so that the heat resistant release sheet A can be used as the heat resistant resin sheet B. The heat resistant resin sheet B can also be used for thermocompression bonding using a thermocompression head set to an even higher temperature when a surface on the polyimide substrate side thereof is used as a surface to be pressed by the thermocompression head. Also, in the heat resistant resin sheet B, a peel force of 0.5 N/mm or more is secured between the substrate and the PTFE layer despite the fact that the PTFE layer is composed of high molecular weight PTFE that is unlikely to maintain a high peel force against the substrate.

DESCRIPTION OF EMBODIMENTS

A heat resistant release sheet of a first aspect of the present disclosure includes a polyimide substrate, and a first PTFE layer and a second PTFE layer that sandwich the polyimide substrate therebetween. PTFE composing the first PTFE layer and PTFE composing the second PTFE layer each have a number-average molecular weight of 6 million or more. A peel force required to peel the first PTFE layer from the polyimide substrate is 0.5 N/20 mm or more, and a peel force required to peel the second PTFE layer from the polyimide substrate is less than 0.5 N/20 mm.

In a second aspect of the present disclosure, the number-average molecular weight of the PTFE composing the first PTFE layer is substantially equal to the number-average molecular weight of the PTFE composing the second PTFE layer in the heat resistant release sheet according to the first aspect.

A method for manufacturing a heat resistant release sheet according to a third aspect of the present disclosure is a method for manufacturing the heat resistant release sheet according to the first aspect or the second aspect. The method includes: forming a film of a PTFE dispersion liquid on each of both principal surfaces of the polyimide substrate, only one of the principal surfaces having been treated with a low-temperature plasma treatment; and by drying and sintering the formed films, forming the first PTFE layer from the film on the one of the principal surfaces and the second PTFE layer from the film on the other principal surface of the polyimide substrate so as to obtain the heat resistant release sheet.

In a fourth aspect of the present disclosure, the low-temperature plasma treatment is a sputter etching treatment in the manufacturing method according to the third aspect.

A heat resistant release sheet of a fifth aspect of the present disclosure includes a polyimide substrate, and a PTFE layer disposed on one of principal surfaces of the polyimide substrate. PTFE composing the PTFE layer has a number-average molecular weight of 6 million or more, and a peel force required to peel the PTFE layer from the polyimide substrate is 0.5 N/20 mm or more.

In a sixth aspect of the present disclosure, the other principal surface of the polyimide substrate is an exposed surface in the heat resistant release sheet according to the fifth aspect.

In a seventh aspect of the present disclosure, a PTFE piece is present on a part of the other principal surface of the polyimide substrate, and PTFE composing the PTFE piece has a number-average molecular weight that is substantially equal to the number-average molecular weight of the PTFE composing the PTFE layer in the heat resistant release sheet according to the fifth aspect or the sixth aspect.

In a method for manufacturing a heat resistant release sheet according to an eighth aspect of the present disclosure, the second PTFE layer is removed from the heat resistant release sheet according to the first aspect or the second aspect so as to obtain the heat resistant release sheet according to any one of the fifth aspect to the seventh aspect.

Hereinafter, embodiments of the present invention will be described with reference to the drawings.

[Heat Resistant Release Sheet]

Figure 1:
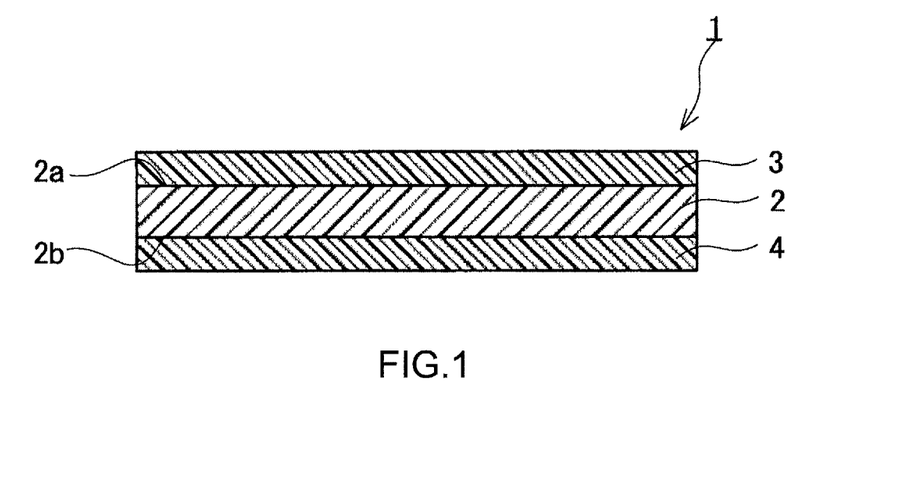
FIG. 1 is a cross-sectional view that shows schematically an example of the heat resistant release sheet A of the present invention.

FIG. 1 shows an example of the heat resistant release sheet A. A heat resistant release sheet 1 shown in FIG. 1 includes a polyimide substrate 2, and a first PTFE layer 3 and a second PTFE layer 4 that sandwich the substrate 2 therebetween. The PTFE layer 3 is disposed on one principal surface 2a selected from principal surfaces 2a and 2b. The PTFE layer 4 is disposed on the other principal surface 2b of the substrate 2. PTFE composing the PTFE layer 3 and PTFE composing the PTFE layer 4 each have a number-average molecular weight of 6 million or more. A peel force A (a peel force between the substrate 2 and the PTFE layer 3) required to peel the PTFE layer 3 from the substrate 2 is 0.5 N/20 mm or more. A peel force B (a peel force between the substrate 2 and the PTFE layer 4) required to peel the PTFE layer 4 from the substrate 2 is less than 0.5 N/20 mm.

The sheet 1 has high releasability on each of the both principal surfaces due to the PTFE layers 3 and 4.

Polyimide and PTFE each are a material with high heat resistance. Polyimide has a higher heat resistance than PTFE. PTFE tends to have a higher heat resistance as its molecular weight increases. Having the polyimide substrate 2 and the PTFE layers 3 and 4, the sheet 1 can also be used for thermocompression bonding at a higher temperature.

A polyimide substrate is less likely to be deformed even at a high temperature than a fluorine resin layer such as a PTFE layer. Therefore, the sheet 1 including the polyimide substrate 2 has excellent dimensional stability at a high temperature. Also, from this viewpoint, the sheet 1 can also be used for thermocompression bonding at a higher temperature.

Generally, in an industrial thermocompression bonding process, a thermocompression head is positioned over a conveying path of objects to be compression-bonded and thermo-compresses continuously the objects to be compression-bonded that are being conveyed on the path one after another. In this thermocompression bonding process, a strip-shaped heat resistant release sheet is, in some cases, fed by being conveyed between the thermocompression head and the objects to be compression-bonded. In such cases, the heat resistant release sheet receives a tension in a longitudinal direction caused by being conveyed as well as heat generated by the thermocompression head. However, a polyimide substrate is less elongated by a tensile force under high temperature than a fluorine resin layer such as a PTFE layer. Therefore, the sheet 1 including the polyimide substrate 2 can be conveyed stably at the time of feed mentioned above. Also, from this viewpoint, the sheet 1 can be used for thermocompression bonding at a higher temperature.

The peel force A between the substrate 2 and the PTFE layer 3 is 0.5 N/20 mm or more. The peel force A is preferably 0.6 N/20 mm or more, and more preferably 0.75

N/20 mm or more. The upper limit of the peel force A is not limited and it is 10 N/20 mm or less, for example. The upper limit may be 5 N/20 mm or less, and further 3 N/20 mm or less. The peel force between the substrate and the PTFE layer can be determined in compliance with T-peel test prescribed in Japanese Industrial Standards (Hereinafter referred to as "JIS") K6854-3:1999.

The peel force B between the substrate 2 and the PTFE layer 4 is 0.5 N/20 mm or less. The peel force B may be 0.4 N/20 mm or less. The lower limit of the peel force B is not limited and it is 0.3 N/20 mm or more, for example.

The PTFE composing the PTFE layer 3 and the PTFE composing the PTFE layer 4 each have a number-average molecular weight of 6 million or more. A PTFE layer composed of PTFE having a number-average molecular weight of 6 million or more has lower adherence to the substrate 2 than a PTFE layer composed of PTFE having a number-average molecular weight of less than 6 million, particularly 4 million or less. Such a PTFE layer usually has a peel force of less than 0.5 N/20 mm against the substrate 2, and further it may be 0.4 N/20 mm or less. The PTFE layer 4 has the peel force B that reflects this low adherence. On the other hand, the PTFE layer 3 has the peel force A of 0.5 N/20 mm or more despite the fact that it is composed of the PTFE having a number-average molecular weight of 6 million or more. The peel force A of the PTFE layer 3, which is higher than the peel force B of the PTFE layer 4, can be obtained by, for example, forming the PTFE layer 3 on a surface of the polyimide substrate 2, the surface having been treated with a low-temperature plasma treatment. However, the means to make the peel force A higher is not limited to the low-temperature plasma treatment.

The PTFE composing the PTFE layer 3 and the PTFE composing the PTFE layer 4 each may have a number-average molecular weight of 7 million or more, 8 million or more, 9 million or more, and further 10 million or more. The upper limit of the number-average molecular weight may be 16 million or less, 14 million or less, and further 12 million or less, for example. The number-average molecular weight of PTFE can be measured by differential scan calorimetric analysis (DSC) based on a technique described in Suwa et al., Journal of Applied Polymer Science, vol. 17, pp. 3253-3257 (1973).

The number-average molecular weight of the PTFE composing the PTFE layer 3 may be substantially equal to the number-average molecular weight of the PTFE composing the PTFE layer 4. The sheet 1 in which the both PTFEs have respectively number-average molecular weights that are substantially equal to each other can be manufactured, for example, by immersing the substrate 2 in a PTFE dispersion liquid so as to form a coating film of the PTFE dispersion liquid on each of the principal surfaces 2a and 2b, and drying and sintering the formed coating films. In this description, the number-average molecular weights are defined to be substantially equal to each other when the difference therebetween is, for example, 1 million or less, preferably 500,000 or less, more preferably 300,000 or less, still more preferably 100,000 or less, and particularly preferably 50,000 or less.

The PTFE layers 3 and 4 each have a thickness of 1 to 50 μm, for example, and it may be 5 to 30 μm. The PTFE layer 3 may have a thickness substantially equal to that of the PTFE layer 4. The sheet 1 in which the PTFE layer 3 has a thickness substantially equal to that of the PTFE layer 4 can be manufactured, for example, by drying and sintering the coating films of the PTFE dispersion liquid formed respectively, through the above-mentioned immersion, on the both principal surfaces 2a and 2b of the substrate 2. In this description, the thicknesses are defined to be substantially equal to each other when the difference therebetween is, for example, 5 μm or less, preferably 3 μm or less, and more preferably 1 μm or less.

The sheet 1 may include the PTFE layers 3 and 4 that respectively are composed of PTFEs having respectively number-average molecular weights substantially equal to each other and that have respectively thicknesses equal to each other.

The PTFE layers 3 and 4 may be composed only of PTFE. However, the PTFE layers 3 and 4 each may contain a material other than PTFE as long as the effects of the present invention can be achieved.

The PTFE layers 3 and 4 each may be a non-porous layer and may be an impermeable layer that allows no fluid, such as water, to permeate therethrough in a thickness direction due to high liquid repellency (water repellency and oil repellency) that PTFE has. Furthermore, the PTFE layers 3 and 4 each may be an insulating layer (a nonconductive layer) due to high insulating properties that PTFE has.

Examples of polyimide composing the substrate 2 include a condensation polymer of tetracarboxylic dianhydride and diamine. However, the polyimide composing the substrate 2 is not limited to the above-mentioned example. In the case where the polyimide is the above-mentioned condensation polymer, the types of the tetracarboxylic dianhydride and diamine are not limited.

The substrate 2 has a thickness of, for example, 5 to 150 μm, and it may be 12.5 to 125 μm.

The substrate 2 may be composed only of polyimide. However, the substrate 2 may contain a material other than polyimide as long as the effects of the present invention can be achieved.

When the PTFE layer 4 that has the relatively low peel force B against the substrate 2 is removed from the heat resistant release sheet A, the heat resistant release sheet A can serves as a heat resistant release sheet B that can also be used for thermocompression bonding using a thermocompression head set at an even higher temperature.

Figure 2:
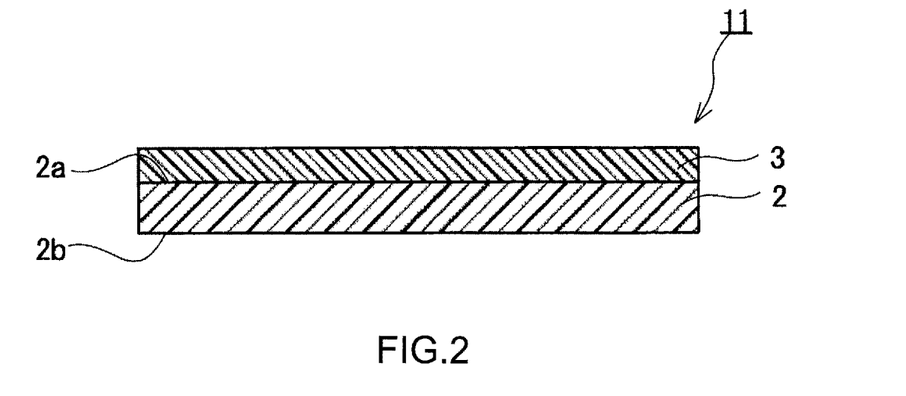
FIG. 2 is a cross-sectional view that shows schematically an example of the heat resistant release sheet B of the present invention.

FIG. 2 shows an example of the heat resistant release sheet B. A heat resistant release sheet 11 shown in FIG. 2 has the polyimide substrate 2 and the PTFE layer 3 disposed on the one principal surface 2a of the substrate 2. The PTFE composing the PTFE layer 3 has a number-average molecular weight of 6 million or more. The peel force A required to peel the PTFE layer 3 from the substrate 2 is 0.5 N/20 mm or more.

Polyimide has high releasability, although it is not as high as that of PTFE. The sheet 11 has sufficient releasability on each of the both principal surfaces due to the polyimide substrate 2 and the PTFE layer 3.

The sheet 11 is the same as the sheet 1 in that the sheet 11 having the polyimide substrate 2 has excellent dimensional stability at a high temperature and can be conveyed and fed stably in an industrial thermocompression bonding process.

Polyimide and PTFE each are a material with high releasability as well as high heat resistance. However, PTFE is superior to polyimide in point of releasability, and polyimide is superior to PTFE in point of heat resistance. In the sheet 11, a surface on the polyimide substrate 2 side is different from a surface on the PTFE layer 3 side in terms of heat resistance and releasability. Specifically, heat resistance is higher on the polyimide substrate 2 side and releasability is higher on the PTFE layer 3 side.

In a heat resistant release sheet, it is an exposed surface in contact with the thermocompression head that is heated up to a highest temperature. In the sheet 11, the surface of the polyimide substrate 2 side, which has higher heat resistance, can be used as a surface to be pressed by the thermocompression head. Therefore, the sheet 11 can also be used for thermocompression bonding using a thermocompression head set at an even higher temperature. This can inhibit the adhesion of the sheet 11 to the thermocompression head at the time of thermocompression bonding, for example. The adhesion of the heat resistant release sheet to the thermocompression head lowers the efficiency of the thermocompression bonding. Also, in the case where a heat resistant release sheet composed of a fluororesin sheet is used, there is a possibility that the heat resistant release sheet that has adhered to the thermocompression head is elongated when being removed therefrom and it becomes difficult for the heat resistant release sheet to be, as a strip-shaped sheet, fed stably by being conveyed as mentioned above. The occurrence of such a problem can be inhibited on the sheet 11 having the polyimide substrate 2. In the sheet 11, a peel force of 0.5 N/mm or more is secured between the PTFE layer 3 and the substrate 2.

In addition, in the case where the thermocompression head is set at an even higher temperature, a problem that the heat resistant release sheet adheres to the object to be compression-bonded, which possibly contains a resin, occurs more easily than a problem that the heat resistant release sheet adheres to the thermocompression head composed of metal. The sheet 11 can be used in such a manner that the surface of the PTFE layer 3 side, which has higher releasability, is in contact with the object to be compression-bonded. Also from this viewpoint, the sheet 11 can also be used for thermocompression bonding using the thermocompression head set at an even higher temperature.

The sheet 11 can be used, for example, at a temperature of the thermocompression head set at 300° C. or higher. Moreover, depending on the structure of the sheet 11, the sheet 11 can be used at a temperature of the thermocompression head set at 315° C. or higher, 330° C. or higher, and further 350° C. or higher. The sheet 11 may be used for a thermocompression bonding process to be conducted at a lower set temperature, of course.

In the sheet 11, another layer may be disposed on the other principal surface 2b of the substrate 2. It is preferable, however, that no other layer is disposed on the principal surface 2b of the substrate 2 because thermocompression bonding using the thermocompression head set at an even higher temperature can be more secured. That is, the principal surface 2b of the substrate 2 is preferably an exposed surface.

In the sheet 11, the other principal surface 2b of the substrate 2 may be a peel surface from which the PTFE layer 4 disposed on the principal surface 2b has been peeled. When the principal surface 2b is the above-mentioned peel surface, a PTFE piece, which is a remainder of the PTFE layer 4, sometimes remains on the principal surface 2b. In this case, PTFE composing the PTFE piece (the PTFE piece derived from the PTFE layer 4) on the principal surface 2b may have a number-average molecular weight of 6 million or more, and it may be essentially equal to the number-average molecular weight of the PTFE composing the PTFE layer 3.

In the sheet 11, the PTFE piece may be present on a part of the principal surface 2b of the substrate 2, and the number-average molecular weight of the PTFE composing the PTFE layer 3 may be substantially equal to the number-average molecular weight of the PTFE composing the PTFE piece.

The sheet 1 may have an area without the PTFE layer 3 and/or the PTFE layer 4. For example, the sheet 1 may have, on at least one surface thereof, an area where the substrate 2 is exposed. The area is, for example: an area at an end of the sheet 1; an area at an end, in a width direction, of the rectangular sheet 1 or the strip-shaped sheet 1; and a section, in a longitudinal direction, of the strip-shaped sheet 1. The section may be present on the strip-shaped sheet 1 at a predetermined distance interval in the longitudinal direction.

The sheet 11 may have an area without the PTFE layer 3. For example, the sheet 11 may have an area where the principal surface 2a of the substrate 2 is exposed. The area is, for example: an area at an end of the sheet 11; an area at an end, in a width direction, of the rectangular sheet 11 or the strip-shaped sheet 11; and a section, in a longitudinal direction, of the strip-shaped sheet 11. The section may be present on the strip-shaped sheet 11 at a predetermined distance interval in the longitudinal direction.

The sheet 1 may have a layer and/or a member other than the polyimide substrate 2, the first PTFE layer 3 and the second PTFE layer 4 as long as the effects of the present invention can be achieved. Examples of the member include a marking piece that shows a point at which the second PTFE layer 4 is peeled from the substrate 2, and a guiding piece that supports the peeling of the second PTFE layer 4 from the substrate 2.

The sheet 11 may have a layer and/or a member other than the polyimide substrate 2 and the first PTFE layer 3 as long as the effects of the present invention can be achieved.

The shapes of the sheets 1 and 11 are not limited. Examples of the shapes include a polygonal shape such as square and rectangle, and circular, oval and strip-shaped. The strip-shaped sheets 1 and 11 each can also be a roll (a winding body).

[Method for Manufacturing Heat Resistant Release Sheet]

Figure 3:
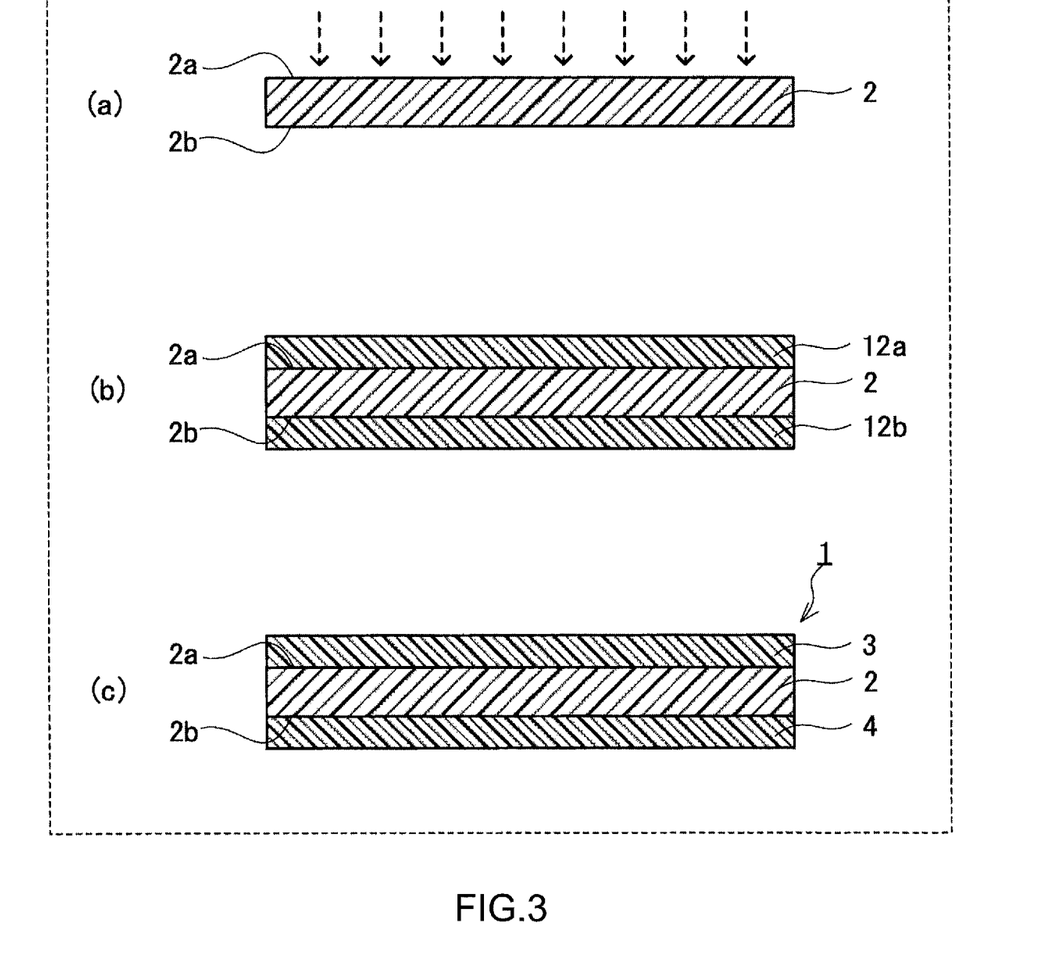
FIG. 3 is a process drawing that shows schematically an example of the method for manufacturing the heat resistant release sheet A of the present invention.

FIG. 3 shows an example of the manufacture of the heat resistant release sheet 1 according to the first manufacturing method. In the example shown in FIG. 3, the sheet 1 is manufactured as follows.

Only the one principal surface 2a of the polyimide substrate 2 is treated with the low-temperature plasma treatment (a surface treatment process (a)). Next, films 12a and 12b of the PTFE dispersion liquid are formed respectively on the both principal surfaces 2a and 2b of the substrate 2 that has been treated with the low-temperature plasma treatment (an application process (b)). PTFE contained in the dispersion liquid has a number-average molecular weight of 6 million or more. Next, by drying and sintering, the first PTFE layer 3 is formed from the film 12a formed on the one principal surface 2a of the substrate 2 and the second PTFE layer 4 is formed from the film 12b formed on the other principal surface 2b so as to obtain the heat resistant release sheet 1 (a sintering process (c)). Due to the low-temperature plasma treatment on the principal surface 2a in the surface treatment process, the peel force A between the substrate 2 and the PTFE layer 3 formed on the principal surface 2a through the sintering process is 0.5 N/20 mm or more. On the other hand, the peel force B between the substrate 2 and the PTFE layer 4 formed on the principal surface 2b that has been untreated with the low-temperature plasma treatment is less than 0.5 N/20 mm.

In the surface treatment process, only the one principal surface 2a of the substrate 2 is treated with the low-temperature plasma treatment. The low-temperature plasma treatment can be carried out under the conditions in which the peel force A is 0.5 N/20 mm or more.

Examples of the low-temperature plasma treatment include a sputter etching treatment, a plasma etching treatment and a corona discharge. The low-temperature plasma treatment is preferably the sputter etching treatment because that further ensures the achievement of the peel force A of 0.5 N/20 mm or more. Examples of a gas used for the sputter etching treatment include oxygen, nitrogen, ammonia and argon. An atmosphere (a degree of vacuum) of the low-temperature plasma treatment is, for example, 0.1 to 20 Pa, and a frequency of a high frequency wave used is, for example, several tens of kHz to several tens of MHz. However, the conditions of the low-temperature plasma treatment are not limited to the above-mentioned examples.

The application process can be carried out by an immersion method, for example. In the immersion method, the substrate 2 is immersed in an immersion tub containing the PTFE dispersion liquid, for example. In the immersion method, it is possible that the substrate 2 after the immersion is conveyed in an approximately perpendicular direction so that the PTFE layer 3 and the PTFE layer 4 that have gone through the sintering process have respectively thicknesses that are substantially equal to each other. However, the concrete method for carrying out the application process is not limited as long as the films 12a and 12b of the PTFE dispersion liquid can be formed respectively on the both principal surfaces 2a and 2b of the substrate 2 that has been treated with the low-temperature plasma treatment.

The PTFE contained in the dispersion liquid has a number-average molecular weight of 6 million or more. The number-average molecular weight of the PTFE contained in the dispersion liquid can fall within the range mentioned above in the explanation of the sheet 1.

The film 12a and the film 12b may be composed of the same PTFE dispersion liquid. In this case, the number-average molecular weight of the PTFE composing the PTFE layer 3 can be substantially equal to the number-average molecular weight of the PTFE composing the PTFE layer 4.

The film 12a and the film 12b that are formed by the application process may have respectively thicknesses that are substantially equal to each other.

A drying temperature in the sintering process is 80 to 120° C., for example. A sintering temperature in the sintering process is a temperature equal to or higher than the melting point of PTFE. The sintering temperature is 340 to 380° C., for example. In the sintering process, the drying and sintering of the films 12a and 12b may be carried out successively. However, the concrete method for carrying out the sintering process as well as the conditions of the drying and sintering carried out in the sintering process are not limited to the above-mentioned examples as long as the PTFE layer 3 can be formed from the film 12a on the principal surface 2a and the PTFE layer 4 can be formed from the film 12b on the principal surface 2b.

The first manufacturing method may include a process other than the ones mentioned above as long as the sheet 1 can be manufactured.

Figure 4:
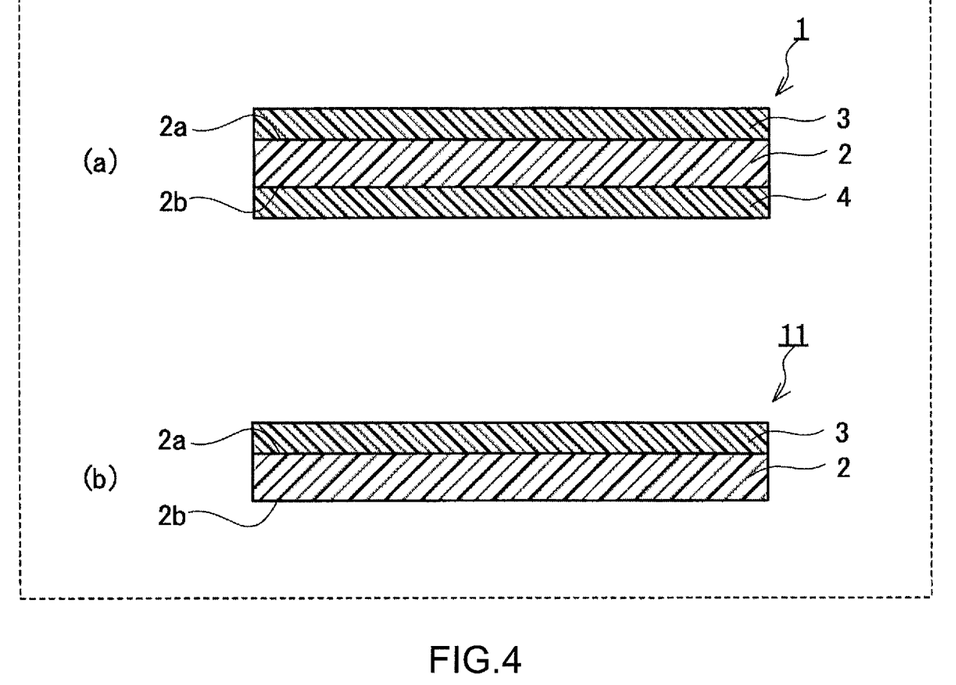
FIG. 4 is a process drawing that shows schematically an example of the method for manufacturing the heat resistant release sheet B of the present invention.

FIG. 4 shows an example of the manufacture of the heat resistant release sheet 11 according to the second manufacturing method. In the example shown in FIG. 4, the sheet 11 is manufactured as follows.

The PTFE layer 4 is removed from the heat resistant release sheet 1 that includes the polyimide substrate 2 and the first and second PTFE layers 3 and 4 that sandwich the substrate 2, and the heat resistant release sheet 11 is obtained (removing processes (a) and (b)).

In the removing processes, the PTFE layer 4 can be removed easily because the peel force between the PTFE layer 4 and the substrate 2 is less than 0.5 N/20 mm. The concrete method for carrying out the removing processes is not limited as long as the PTFE layer 4 can be removed from the heat resistant release sheet 1.

The second manufacturing method may include a process other than the ones mentioned above as long as the sheet 11 can be manufactured.

[Use of Heat Resistant Release Sheet]

Figure 5:
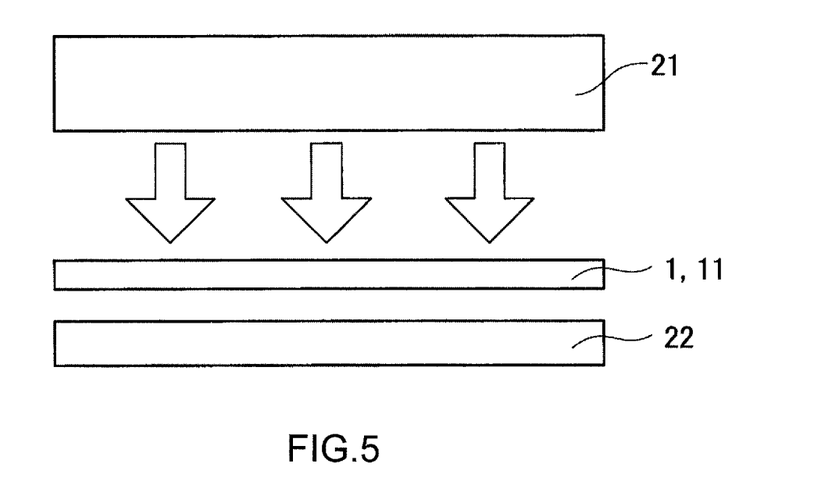
FIG. 5 is a schematic view for explaining an example of a thermo compression bonding method using the heat resistant release sheet of the present invention.

As shown in FIG. 5, the sheets 1 and 11 each can be used as a heat resistant release sheet that is disposed between a thermocompression head 21 and an object 22 to be compression-bonded at the time of thermocompression-bonding the object 22 to be compression-bonded so as to prevent adhesion between the thermocompression head 21 and the object 22 to be compression-bonded. When used in such a manner that the polyimide substrate 2 faces the thermocompression head 21 and the PTFE layer 3 faces the object 22 to be compression-bonded, the sheet 11 can also be used for thermocompression bonding using the thermocompression head set at an even higher temperature.

Examples of the object 22 to be compression-bonded include a semiconductor chip, a PCB and an electronic part. The sheets 1 and 11 can be used, for example, for flip chip mounting of semiconductor chips, manufacturing of PCBs and bonding of electronic parts by thermocompression bonding.

EXAMPLES

Hereinafter, the present invention is described in more detail with reference to examples. The present invention is not limited to the following examples.

Experimental Example 1: Relation Between Number-Average Molecular Weight of PTFE and Peel Force of PTFE Layer Against Polyimide Substrate A polyimide substrate (Apical AH, with a thickness of 25 µm, available from KANEKA CORPORATION) was immersed in a PTFE dispersion liquid (Fluon AD911E, in which PTFE has a number-average molecular weight of 5 million, available from AGC Inc.) and pulled up therefrom so as to form films of the dispersion liquid respectively on both principal surfaces of the substrate. Next, the substrate was heated for 5 minutes in a furnace set at 100° C. to dry the films, and then the substrate was heated for another 5 minutes in a furnace set at 380° C. to sinter the dried films. Thus, PTFE layers (each having a thickness of 10 µm) were formed.

Using a laminate A of the polyimide substrate and the PTFE layers thus formed, a peel force of the PTFE layers against the polyimide substrate was measured in compliance with a T-peel test prescribed in JIS K6854-3:1999. In the peel test, a rectangular specimen with a length of 200 mm and a width of 20 mm was used. The specimen was prepared by: sticking, on one of the PTFE layers, an adhesive tape (No. 360UL, with a thickness of 0.06 mm, available from Nitto Denko Corporation) to reinforce the PTFE layer and prevent the PTFE layer from being elongated at the time of the test; then cutting out the laminate A into a rectangular shape of the above-mentioned dimensions; and peeling, in a length direction, the PTFE layer to which the adhesive tape was stuck from the polyimide substrate of the obtained cut piece over a distance of 50 mm from one end in the length direction. The length direction of the cut piece and the specimen was defined as the direction in which the polyimide substrate was immersed into the PTFE dispersion liquid. A width direction of the cut piece and the specimen was defined as a direction that is perpendicular, in-plane, to the direction of the immersion mentioned above. A precision universal tester Autograph AG-I, available from SHIMADZU CORPORATION, was used as a tensile testing machine. A moving speed (a peeling speed) of a pair of grips to hold respectively the polyimide substrate and the one of the PTFE layers at a peeling portion was 300 mm/minute. The number n of the specimens was 5. The "average peel force" defined in JIS K6854-3:1999 was evaluated for each specimen, and the evaluated "average peel forces" of the specimens were averaged to calculate an average over the specimens (an average over n=5). The average over the specimens was defined as the peel force of the PTFE layer against the polyimide substrate. Table 1 shows the measurement result of the peel force.

Separately, a laminate B of the polyimide substrate and the PTFE layers was made in the same manner as above except that Fluon AD938E (in which PTFE has a number-average molecular weight of 10 million), available from AGC Inc., was used as the PTFE dispersion liquid. The T-peel test, in which one of the PTFE layers is peeled, was carried out on the laminate B in the same manner as above so as to measure the peel force of the PTFE layer against the polyimide substrate. Table 1 shows the peel force measured.

TABLE 1

| Laminate | A | B |
| --- | --- | --- |
| Number-average molecular weight of PTFE | 5 million | 10 million |
| Peel force (N/20 mm) | 1.0 | 0.38 |

As shown in Table 1, there was a large difference between the peel force, against the polyimide substrate, of the PTFE layer (the PTFE layer of the laminate B) composed of the PTFE having a number-average molecular weight of 6 million or more and the peel force, against the polyimide substrate, of the PTFE layer (the PTFE layer of the laminate A) composed of the PTFE having a number-average molecular weight of less than 6 million. The former peel force was 0.38 N/20 mm or less.

Experimental Example 2: Increasing Peel Force by Sputter Etching Treatment

A laminate C of the polyimide substrate and the PTFE layers was made in the same manner as the laminate B of Experimental Example 1 except that one of the principal surfaces of the polyimide substrate was treated with a sputter etching treatment (with a gas volume of 250 to 1300 scc/minute, a vacuum degree of 5 Pa, a power of 3 to 7 kW, and a frequency of 13.56 MHz) using argon gas. The T-peel test, in which the PTFE layer formed on the one of the principal surfaces is peeled, was carried out on the laminate C in the same manner as in Experimental Example 1 so as to measure the peel force of the PTFE layer against the polyimide substrate. The peel force measured was 0.75 N/20 mm, which is higher than the peel force of 0.38 N/20 mm measured on the laminate B made in Experimental Example 1. In Experimental Example 2, it was confirmed that, due to the sputter etching treatment given to the polyimide substrate, the PTFE layer (composed of the PTFE having a number-average molecular weight of 6 million or more) formed on the treated surface had an increased peel force against the polyimide substrate.

Example 1

The PTFE layer formed on the other principal surface of the polyimide substrate was removed from the laminate C made in Experimental Example 2, in which the other principal surface had been untreated with the sputter etching treatment. Thus, a laminate D of the polyimide substrate and the PTFE layers was made.

A thermocompression-bonding test was carried out, in which the laminate D was used as the heat resistant release sheet, the thermocompression head was set at 300° C., 330° C. or 350° C., a linear pressure was 1 kN, and compression bonding time was 30 seconds. The laminate D was disposed in such a manner that a surface on the polyimide substrate faced the thermocompression head and a surface on the PTFE layer faced an object to be compression-bonded.

In Example 1, there was no adhesion of the heat resistant release sheet to the thermocompression head and the object to be compression-bonded even when the thermocompression head was set at 350° C. There was almost no dimensional change in the heat resistance release sheet by the thermocompression-bonding test.

Comparative Example 1

A thermocompression-bonding test was carried out in the same manner as in Example 1, in which a single layer PTFE sheet (NITOFLON No. 900UL available from Nitto Denko Corporation) was used as the heat resistant release sheet. In Comparative Example 1, there was a dimensional change in the heat resistant release sheet by the thermocompression-bonding test in which the thermocompression head was set at 330° C. Also, there was adhesion of the heat resistant release sheet to the thermocompression head when the thermocompression head was set at 350° C. Moreover, when the heat resistant release sheet that had adhered to the thermocompression head was removed therefrom, the sheet was elongated and failed to be removed from the thermocompression head without elongation.

The present invention is applicable to various other embodiments unless they depart from the intentions and the essential features of the invention. The embodiments disclosed in this description are explanatory in all senses and do not limit the present invention. The scope of the present invention is represented not by the above explanation but by accompanying claims, and encompasses all modifications which have a meaning and scope equivalent to the claims.

INDUSTRIAL APPLICABILITY

The heat resistant release sheet of the present invention can be disposed between a thermocompression head and an object to be compression-bonded at the time of thermocompression bonding and can be used to prevent adhesion between the thermocompression head and the object to be compression-bonded.

Thermocompression bonding using the heat resistant release sheet of the present invention is applicable to flip chip mounting of semiconductor chips, manufacturing of PCBs, and bonding of electronic parts, for example.

DESCRIPTION OF NOTATIONS

1 Heat-resistant release sheet
2 Polyimide substrate

2a Principal surface
2b Principal surface
3 First PTFE layer
4 Second PTFE layer
11 Heat-resistant release sheet
12a, 12b Films (of PTFE dispersion liquid)
21 Thermocompression head
22 Object to be compression-bonded

The invention claimed is:

1. A heat resistant release sheet comprising
a polyimide substrate; and
a first polytetrafluoroethylene (PTFE) layer and a second PTFE layer that sandwich the polyimide substrate therebetween, wherein
PTFE composing the first PTFE layer and PTFE composing the second PTFE layer each have a number-average molecular weight of 6 million or more, and
a peel force required to peel the first PTFE layer from the polyimide substrate is 0.5 N/20 mm or more, and a peel force required to peel the second PTFE layer from the polyimide substrate is less than 0.5 N/20 mm.

2. The heat resistant release sheet according to claim 1, wherein the number-average molecular weight of the PTFE composing the first PTFE layer is substantially equal to the number-average molecular weight of the PTFE composing the second PTFE.

3. A method for manufacturing the heat resistant release sheet according to claim 1, comprising:
forming a film of a PTFE dispersion liquid on each of both principal surfaces of the polyimide substrate, only one of the principal surfaces having been treated with a low-temperature plasma treatment; and
by drying and sintering the formed films, forming the first PTFE layer from the film on the one of the principal surfaces and the second PTFE layer from the film on the other principal surface of the polyimide substrate so as to obtain the heat resistant release sheet.

4. The method for manufacturing the heat resistant release sheet according to claim 3, wherein the low-temperature plasma treatment is a sputter etching treatment.

5. A heat resistant release sheet comprising:
a polyimide substrate; and
a polytetrafluoroethylene (PTFE) layer disposed on one of principal surfaces of the polyimide substrate, wherein
PTFE composing the PTFE layer has a number-average molecular weight of 6 million or more, and
a peel force required to peel the PTFE layer from the polyimide substrate is 0.5 N/20 mm or more.

6. The heat resistant release sheet according to claim 5, wherein the other principal surface of the polyimide substrate is an exposed surface.

7. The heat resistant release sheet according to claim 5, wherein
a PTFE piece is present on a part of the other principal surface of the polyimide substrate, and
PTFE composing the PTFE piece has a number-average molecular weight that is substantially equal to the number-average molecular weight of the PTFE composing the PTFE layer.

8. A method for manufacturing a heat resistant release sheet, comprising:
removing the second PTFE layer from the heat resistant release sheet according to claim 1; and
obtaining a heat resistant release sheet comprising:
a polyimide substrate; and
a polytetrafluoroethylene (PTFE) layer disposed on one of principal surfaces of the polyimide substrate, wherein
PTFE composing the PTFE layer has a number-average molecular weight of 6 million or more, and
a peel force required to peel the PTFE layer from the polyimide substrate is 0.5 N/20 mm or more.

* * * * *